T. D. PRINDIVILLE.
AUXILIARY BODY FOR AUTOMOBILES.
APPLICATION FILED NOV. 8, 1912.

1,099,818.

Patented June 9, 1914.

2 SHEETS—SHEET 1.

Inventor
Thomas D. Prindiville
By Victor J. Evans
Attorney

Witnesses

T. D. PRINDIVILLE.
AUXILIARY BODY FOR AUTOMOBILES.
APPLICATION FILED NOV. 8, 1912.
1,099,818.
Patented June 9, 1914.
2 SHEETS—SHEET 2.
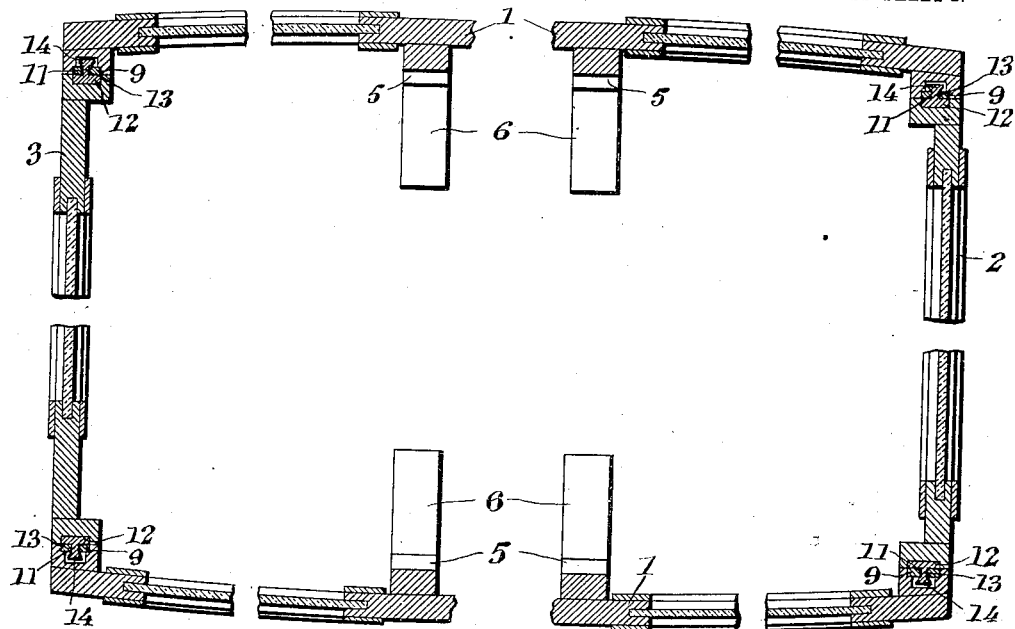
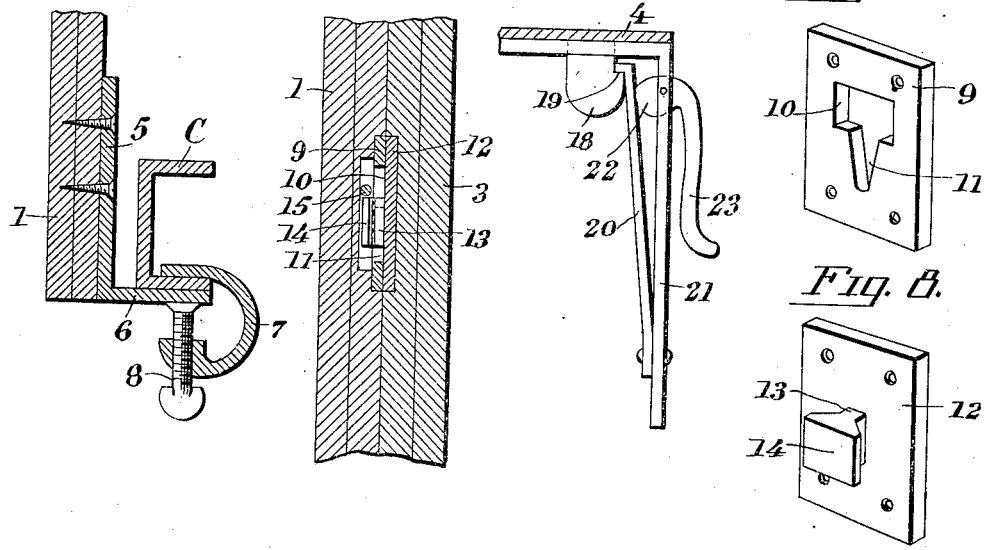
Witnesses
M. F. Garnett
P. M. Smith
Inventor
Thomas D. Prindiville
By Victor J. Evans
Attorney

UNITED STATES PATENT OFFICE.

THOMAS D. PRINDIVILLE, OF ST. LOUIS, MISSOURI, ASSIGNOR OF ONE-HALF TO ROBERT H. ALBRECHT, OF ST. LOUIS, MISSOURI.

AUXILIARY BODY FOR AUTOMOBILES.

1,099,818. Specification of Letters Patent. Patented June 9, 1914.

Application filed November 8, 1912. Serial No. 730,289.

*To all whom it may concern:*

Be it known that I, THOMAS D. PRINDIVILLE, a citizen of the United States, residing at St. Louis, in the State of Missouri, have invented new and useful Improvements in Auxiliary Bodies for Automobiles, of which the following is a specification.

This invention relates to auxiliary bodies for automobiles, the object in view being to provide a sectional limousine or storm body for automobiles which may be easily and quickly mounted in place upon the chassis of an automobile, and which will entirely surround, encompass and inclose the body with which the machine is originally provided, thereby protecting the occupants from the weather.

With the above and other objects in view, the invention consists in the construction, combination and arrangement of parts, as will be hereinafter more fully described, illustrated in the accompanying drawings, and pointed out in the claim hereunto appended.

Figure 1:
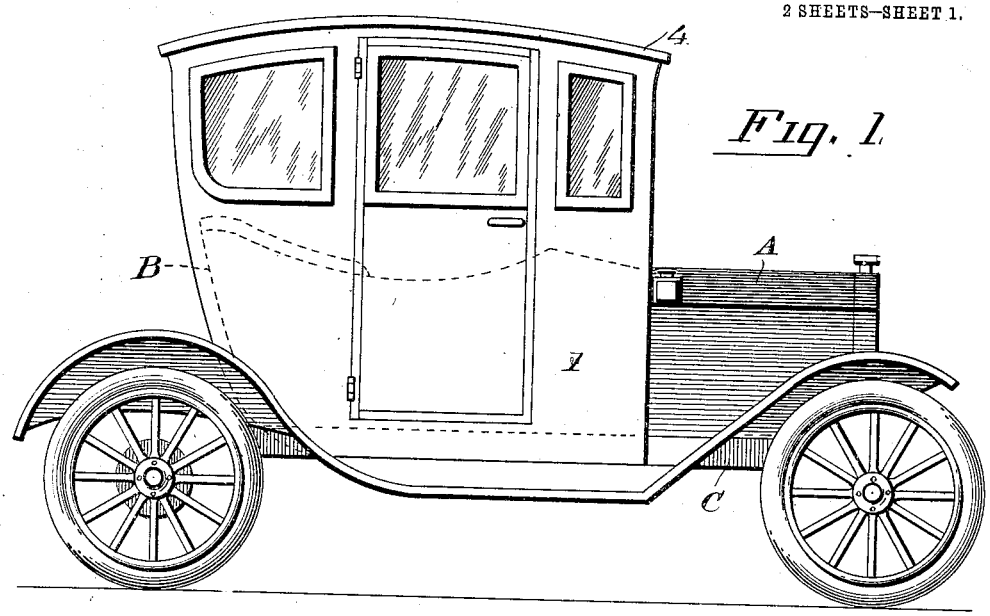
Figure 2:
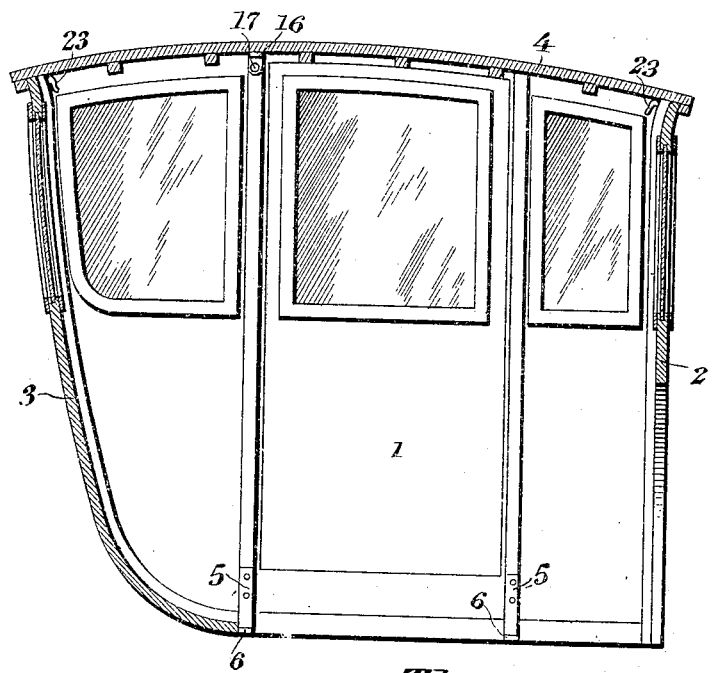

In the drawings: Figure 1 is a side elevation of an automobile, showing the auxiliary body in place thereon. Fig. 2 is a vertical longitudinal section through the same. Fig. 3 is a horizontal longitudinal section through the body. Fig. 4 is a detail sectional view, showing the bottom fastening. Fig. 5 is a similar view, illustrating the side fastening. Fig. 6 is a similar view, showing the top fastening. Fig. 7 is a perspective view of one of the socket plates. Fig. 8 is a perspective view of one of the tongue plates.

Referring to the drawings, A designates an automobile, comprising the usual uncovered body B, such as is ordinarily employed in touring cars and roadsters, C designating the side bars of the chassis, all of said parts being of the usual construction and arrangement.

The auxiliary body contemplated in this invention is designed to extend entirely around the primary or original body B of the machine, and in order that the same may be easily applied to and removed from its position, said body is made up of a number of sections, the body comprising the oppositely arranged sides 1, the front 2, back 3, and top or cover 4. Each of the sides 1 is provided at its bottom edge with a plurality of angle brackets 5, the horizontal inwardly extending portions 6 of which are adapted to abut against the side bars C of the chassis, the same being fastened securely in place by means of U-shaped clamps 7 provided with clamping screws 8.

Extending along the front and rear uprights of the sides 1 and secured to the inner faces thereof, are socket plates 9, each of which is provided with a substantially T-shaped slot, or in other words, a slot embodying a relatively wide upper portion 10, and a narrower lower portion 11 which is made gradually tapering or narrowing in width toward the bottom, the purpose of which is to enable the tongue member, hereinafter referred to, to wedge itself tightly in said slot.

Secured to the corresponding side uprights of the front and back 2 and 3, respectively, are tongue members, each embodying a base or attaching plate 12 secured in any convenient manner, and provided with an outwardly extending tongue 13 having an expanded end portion 14, just narrow enough to pass through the wider portion 10 of the slot in the plate 9, while the body of the tongue 13 is adapted to move downwardly in the tapering portion 11 of the slot, the wider portion of the tongue being caught and held behind the plate 9. This provides for detachably fastening the front and back of the body to the oppositely located sides of the same. In order to prevent any relative up and down movement between the sides and the front and back of the body, I provide a sliding locking bolt 15 which is movable in a plane just over the uppermost tongue and socket fastening just hereinabove described, said plate forming in effect a bolt for locking the sections together at the corners where they meet.

The top or cover 4 is provided intermediate its ends with downwardly extending ears 16 adapted to receive thumb screws 17 entering the sides 1, so as to hold the top or cover in place thereon. At its four corners, the top or cover is provided with downwardly extending tongues or projections 18, which are notched to form shoulders 19, each of which is adapted to be engaged by a spring catch 20 fastened to an inside corner bracket 21. Arranged behind the spring catch 20 is an operating cam 22 having an extending lever 23, by means of which the cam is operated. The top or cover 4 is placed upon the sides and the front and back, and the projections 18 extend downward until the spring catches 20 snap into engagement with the shoulders 19 thereof, in which position they may be clamped by means of the cams 22.

In view of the foregoing description, it will be seen that the auxiliary body is composed of five main sections, and that all of said sections are securely fastened together but adapted to be readily detached from each other and from the frame or chassis of the automobile.

When the auxiliary body is in place on the machine, it entirely incloses and encompasses the original or usual body of the machine, and therefore the seats of the machine are properly located under either arrangement. The body serves as an ample protection for the occupants of the machine in bad weather, may be easily and quickly applied and removed, may be made quite light in construction, and may be given any desired ornamentation or finish, in accordance with the desires of the manufacturer or owner.

What is claimed is:

An auxiliary demountable sectional and knock down limousine body for automobiles, comprising two sides each embodying a door opening which is entirely surrounded by and included between the top and bottom and side margins thereof; a front, a back, and a top, angle brackets at the bottom edges of said sides adapted to extend under the side frame bars of the chassis, means for fastening said angle brackets to said side bars of the chassis, other fastening means for securing the front and back to the sides, and means for fastening the marginal edges of the top to the sides, the auxiliary body as a whole when in place encompassing the original body of the machine so as to entirely inclose and cover the same.

In testimony whereof I affix my signature in presence of two witnesses.

THOMAS D. PRINDIVILLE.

Witnesses:
LAURENCE PRINDIVILLE,
CHARLES LEONHARDT.